(12) United States Patent
Ding et al.

(10) Patent No.: US 11,997,247 B2
(45) Date of Patent: May 28, 2024

(54) THREE-DIMENSIONAL SPACE CAMERA AND PHOTOGRAPHING METHOD THEREFOR

(71) Applicant: AGAPE MEDICAL TECHNOLOGIES CO., LTD., Shanghai (CN)

(72) Inventors: Yong Ding, Shanghai (CN); Dawei Ding, Shanghai (CN); Dalu Ding, Shanghai (CN); Rongzhi Jiang, Shanghai (CN); Xiaohai Jiang, Shanghai (CN); Qinfu Ji, Shanghai (CN)

(73) Assignee: AGAPE MEDICAL TECHNOLOGIES CO., LTD., Shanghai (CN)

( * ) Notice: Subject to any disclaimer, the term of this patent is extended or adjusted under 35 U.S.C. 154(b) by 13 days.

(21) Appl. No.: 17/794,264

(22) PCT Filed: Feb. 7, 2021

(86) PCT No.: PCT/CN2021/075868
§ 371 (c)(1),
(2) Date: Nov. 29, 2022

(87) PCT Pub. No.: WO2021/148050
PCT Pub. Date: Jul. 29, 2021

(65) Prior Publication Data
US 2023/0084212 A1 Mar. 16, 2023

(30) Foreign Application Priority Data
Jan. 22, 2020 (CN) .......................... 202010075630.0

(51) Int. Cl.
*H04N 13/128* (2018.01)
*H04N 13/189* (2018.01)

(52) U.S. Cl.
CPC ......... *H04N 13/189* (2018.05); *H04N 13/128* (2018.05)

(58) Field of Classification Search
CPC .. H04N 13/189; H04N 13/128; H04N 13/296; H04N 13/239; H04N 2013/0081; H04N 13/275
(Continued)

(56) References Cited

U.S. PATENT DOCUMENTS 9,687,308 B2 * 6/2017 Windolf ................. A61B 34/30
9,918,175 B2 * 3/2018 Lee .......................... H04S 7/301
(Continued)

FOREIGN PATENT DOCUMENTS

CN 107801017 A 3/2018
CN 107864372 A 3/2018
(Continued)

*Primary Examiner* — Helen Shibru
(74) *Attorney, Agent, or Firm* — Bayramoglu Law Offices LLC

(57) ABSTRACT

A 3D camera and a photographing method thereof are provided. The 3D camera includes an image 1 photographing unit and an image 2 photographing unit in the same optical system and a processing system that processes data of the image 1 photographing unit and the image 2 photographing unit. The processing system includes a control unit that controls image photographing by the image 1 photographing unit and the image 2 photographing unit, a recording and storage unit that performs processing on the control unit, and a 3D coordinate calculation unit that performs calculation on the recording and storage unit. 3D coordinates of an object point in 3D space or all space object points constituting a 3D object directly facing the camera are calculated by simultaneously photographing one or more pairs of images for the object point in the 3D space or all space object points constituting the 3D object.

18 Claims, 11 Drawing Sheets

(58) Field of Classification Search
USPC .......................................................... 348/51
See application file for complete search history.

(56) References Cited

U.S. PATENT DOCUMENTS

| | | | |
|---|---|---|---|
| 10,634,823 B2 * | 4/2020 | Lee .......................... | G06F 30/00 |
| 10,715,711 B2 * | 7/2020 | Lee ....................... | H04N 13/232 |
| 2023/0269353 A1 * | 8/2023 | Simek .................. | H04N 13/254 |
| | | | 348/46 |
| 2023/0276041 A1 * | 8/2023 | Peterson ................ | H04N 13/31 |
| | | | 348/51 |

FOREIGN PATENT DOCUMENTS

| | | | | |
|---|---|---|---|---|
| CN | 109068035 | A | 12/2018 | |
| CN | 111277811 | A | 6/2020 | |
| EP | 3480648 | A1 * | 5/2019 | ........... G02B 17/006 |
| WO | 2019007180 | A1 | 1/2019 | |

* cited by examiner

THREE-DIMENSIONAL SPACE CAMERA AND PHOTOGRAPHING METHOD THEREFOR

CROSS REFERENCE TO THE RELATED APPLICATIONS

This application is the national phase entry of International Application No. PCT/CN2021/075868, filed on Feb. 7, 2021, which is based upon and claims priority to Chinese Patent Application No. 202010075630.0, filed on Jan. 22, 2020, the entire contents of which are incorporated herein by reference.

TECHNICAL FIELD

The present disclosure belongs to the technical field of three-dimensional (3D) cameras and particularly relates to a 3D camera and a photographing method thereof.

BACKGROUND

Cameras have been around for 180 years but can record only a two-dimensional (2D) world without the distance and depth information in the third dimension. To obtain the distance and depth information, some auxiliary technologies are required, such as ultrasonic ranging, laser radar ranging, infrared ranging, monocular structured light ranging, and binocular ranging. Ultrasonic, laser, infrared, and other apparatuses calculate the distance between a measured object and a sensor by measuring the time difference between emission and return of an emission source. This is called an active method. Ranging through the active method is convenient, rapid, and simple to calculate. Therefore, the active method has been widely used in real-time control. However, emission and receiving devices are expensive and costly, and it is difficult to avoid environmental problems, such as reflection, noise, and crossover, and achieve a large pixel and universal applicability. The monocular structured light ranging can be used only for short-distance measurement, such as structured light ranging of a face distance developed to improve the accuracy of face recognition. Binocular stereo vision can accurately restore 3D information of a field of view through parallax information of two images provided by left and right cameras. However, in binocular vision, obtaining spatial distance information requires matching analysis of corresponding points of the left and right images, which involves a large amount of calculation. Binocular vision measurement is also easily affected by the mismatch of feature points, and it is difficult to meet real-time requirements.

SUMMARY

An objective of the present disclosure is to provide a 3D camera and a photographing method thereof.

To achieve the foregoing objective, the present disclosure adopts the following technical solutions:

A 3D camera includes an image 1 photographing unit and an image 2 photographing unit in the same optical system and a processing system that processes data of the image 1 photographing unit and the image 2 photographing unit. The processing system includes a control unit that controls image photographing by the image 1 photographing unit and the image 2 photographing unit, a recording and storage unit that performs processing on the control unit, and a 3D coordinate calculation unit that performs calculation on the recording and storage unit. The processing system is connected to the image 1 photographing unit and the image 2 photographing unit through signal connection and control lines.

The same optical system is a coaxial spherical system. The distance between the principal planes of the image 1 photographing unit and the image 2 photographing unit is D, and D is not less than zero.

At least one image 1 conversion unit is further disposed between the image 1 photographing unit and the image 2 photographing unit. The image 1 conversion unit is connected to the processing system through a signal connection and control line. The distance between the principal planes of the image 1 conversion unit and the image 1 photographing unit is E, and E is not less than zero.

At least one image 1 parallel correlation imaging unit is further disposed for the image 1 photographing unit. The image 1 parallel correlation imaging unit is connected to the processing system through a signal connection and control line. An optical path of the image 1 parallel correlation imaging unit is the same as or correlates with an optical path of the image 1 photographing unit. The distance between the principal planes of the image 1 parallel correlation imaging unit and the image 1 photographing unit is G, and G is not less than zero.

At least one image 1 parallel correlation imaging unit conversion unit is further disposed between the image 1 parallel correlation imaging unit and the image 2 photographing unit. The image 1 parallel correlation imaging unit conversion unit is connected to the processing system through a signal connection and control line. The distance between the image 1 parallel correlation imaging unit and the image 1 parallel correlation imaging unit conversion unit is K, and K is not less than zero.

A photographing method of the 3D camera is provided. When the optical system and an optical subsystem are both coaxial spherical systems, 3D coordinates of an object point are represented by an object height H0, an object distance U0, and an optical meridian plane angle α. The method includes the following steps:

(1) photographing, by the image 1 photographing unit, an object point in 3D space, and photosensitively recording a 2D image 1, where there are coordinates, namely, an image height and an optical meridian plane angle, of an image point 1 of the object point on the 2D image 1;

(2) photographing, by the image 2 photographing unit, the image point 1 on an optical path of the image 1 photographing unit, and photosensitively recording a 2D image 2, where there are coordinates, namely, an image height and an optical meridian plane angle, of an image point 2 indirectly from the object point on the 2D image 2;

(3) setting, by the control unit, a group of optical system parameters, where the image point 1 and the image point 2 of the object point in a specific depth of field are clearly recorded on image 1 and image 2 through the group of parameters, respectively; recording and storing, by the recording and storage unit, data of the image 1 and the image 2 on photoreceptors of the image 1 photographing unit and the image 2 photographing unit; and calculating, by the 3D coordinate calculation unit, 2D coordinates of the image points on the image 1 and the image 2 by using the data recorded by the recording and storage unit and the optical system parameters of the image 1 photographing unit and the image 2 photographing unit to obtain 3D coordinates, namely, an object distance, an object height, and an optical meridian plane angle, of the object point in the 3D space, and storing the 3D coordinates;

(4) repeating step 3) to obtain 3D coordinates of the object point in the 3D space in another depth of field, and storing the 3D coordinates; and (5) for each object point whose 3D coordinates need to be measured, performing division to obtain one or more depths of field, repeating steps 3) and 4) to obtain a pair of images 1 and 2 of the object point in an entire required depth range, and 3D coordinates, namely, an object distance, an object height, and an optical meridian plane angle, of the object point in the 3D space in the entire depth range, storing the 3D coordinates, and displaying a 3D photo of the object through a display or a projector.

Further, in step 2), at least one image 1 conversion unit is disposed between the image 1 photographing unit and the image 2 photographing unit. The image 1 conversion unit optically converts image point 1 to image point i on an optical path of the image 1 conversion unit. The image 2 photographing unit photographs the image point i and photosensitively records a 2D image 3, and there are coordinates, namely, an image height and an optical meridian plane angle, of the image point 2 indirectly from the object point on the 2D image 3.

Further, in step 2), at least one image 1 parallel correlation imaging unit is disposed for the image 1 photographing unit, the image 1 parallel correlation imaging unit images the object point in the 3D space to obtain an image point 1', the image 2 photographing unit photographs the image point 1' and photosensitively records a 2D image 4, and there are coordinates, namely, an image height and an optical meridian plane angle, of the image point 2 indirectly from the object point on the 2D image 4.

Further, in step 2), at least one image 1 parallel correlation imaging unit conversion unit is disposed between the image 1 parallel correlation imaging unit and the image 2 photographing unit, the image 1 parallel correlation imaging unit images the object point in the 3D space to obtain the image point 1'. The image 1 parallel correlation imaging unit conversion unit optically converts image point 1' to an image point i' on an optical path of the image 1 parallel correlation imaging unit conversion unit. The image 2 photographing unit photographs the image point i' and photosensitively records a 2D image 5, and there are coordinates, namely, an image height and an optical meridian plane angle, of the image point 2 indirectly from the object point on the 2D image 5.

Further, light or a wave used to form image 1 and image 2, image 3, image 4, or image 5 is visible light, infrared light, ultraviolet light, an X-ray, an electromagnetic wave, or an ultrasonic wave.

Further, the object point is luminous due to the light of the object point or light generated by a light source irradiating the object point.

Further, in step 3), the calculating, by the 3D coordinate calculation unit, 2D coordinates of the image points on image 1 and image 2 by using the data recorded by the recording and storage unit and the optical system parameters of the image 1 photographing unit and the image 2 photographing unit to obtain 3D coordinates, namely, an object distance, an object height, and an optical meridian plane angle, of the object point in the 3D space is specifically as follows:

a set of all optical system parameters of the optical system is Oi (i=1, . . . N);

Oi is a minimum or independent set of N optical system parameters that describe characteristics of the entire optical system;

the optical meridian plane angle of image point 1 is α1 and that of image point 2 is α2;

the image height of image point 1 is H1 and the image height of image point 2 is H2;

that is:

the optical meridian plane angle of the object point is α0;

$$\alpha 0 = \Phi(Oi, \alpha 1, \alpha 2, H1, H2)$$

$$i=1,2,\ldots,N \qquad \text{(formula 11)}$$

the object distance of the object point is U0;

$$U0 = \Omega(Oi, \alpha 1, \alpha 2, H1, H2)$$

$$i=1,2,\ldots,N \qquad \text{(formula 12)}$$

the object height of the object point is H0;

$$H0 = \Psi(Oi, \alpha 1, \alpha 2, H1, H2)$$

$$i=1,2,\ldots,N \qquad \text{(formula 13)}.$$

The present disclosure has the following advantages: The camera calculates the 3D coordinates of an object point in 3D space or all space object points constituting a 3D object directly facing the camera by simultaneously photographing one or more pairs of images for the object point in the 3D space or all space object points constituting the 3D object and calculating a height ratio relationship of these object points in the pairs of images (corresponding photographing and recording and storage of a stereo photo). The 3D coordinates of these space objects obtained by photographing the pairs of images can be used to display the objects in the 3D space through a computer or another stereo display technology.

Figure 5:
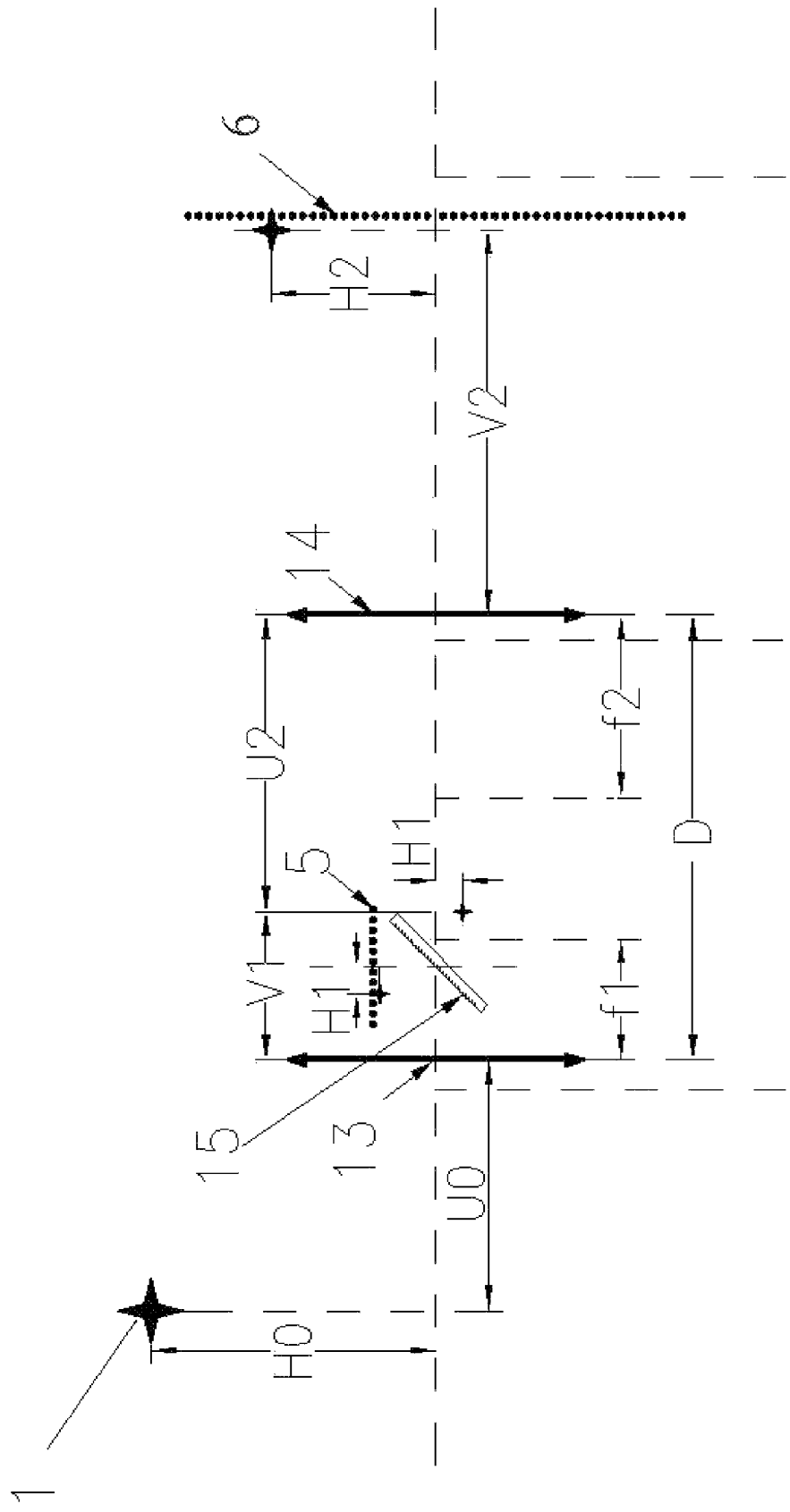
FIG. 5 is a schematic diagram of an optical path configuration in Experimental Example 1.
Figure 10:
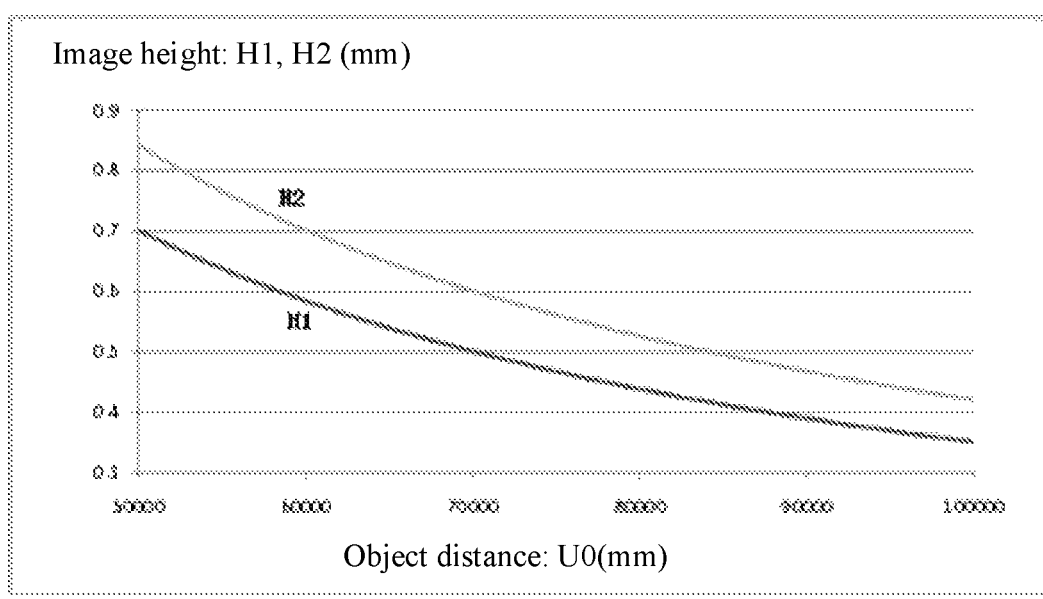
Figure 11:
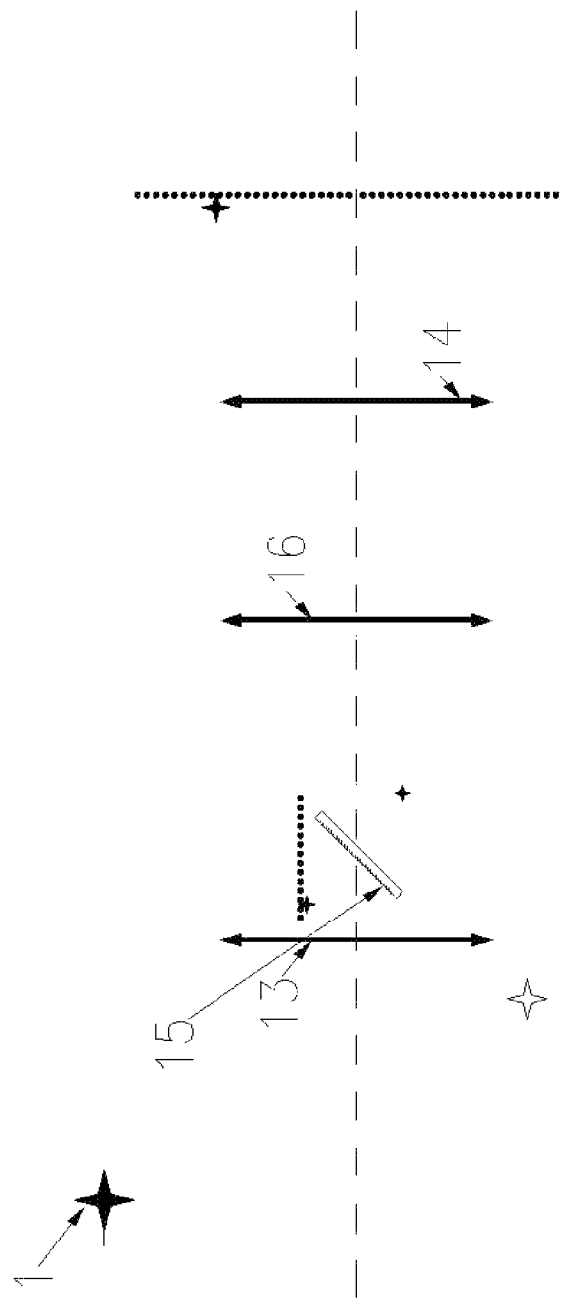
Figure 12:
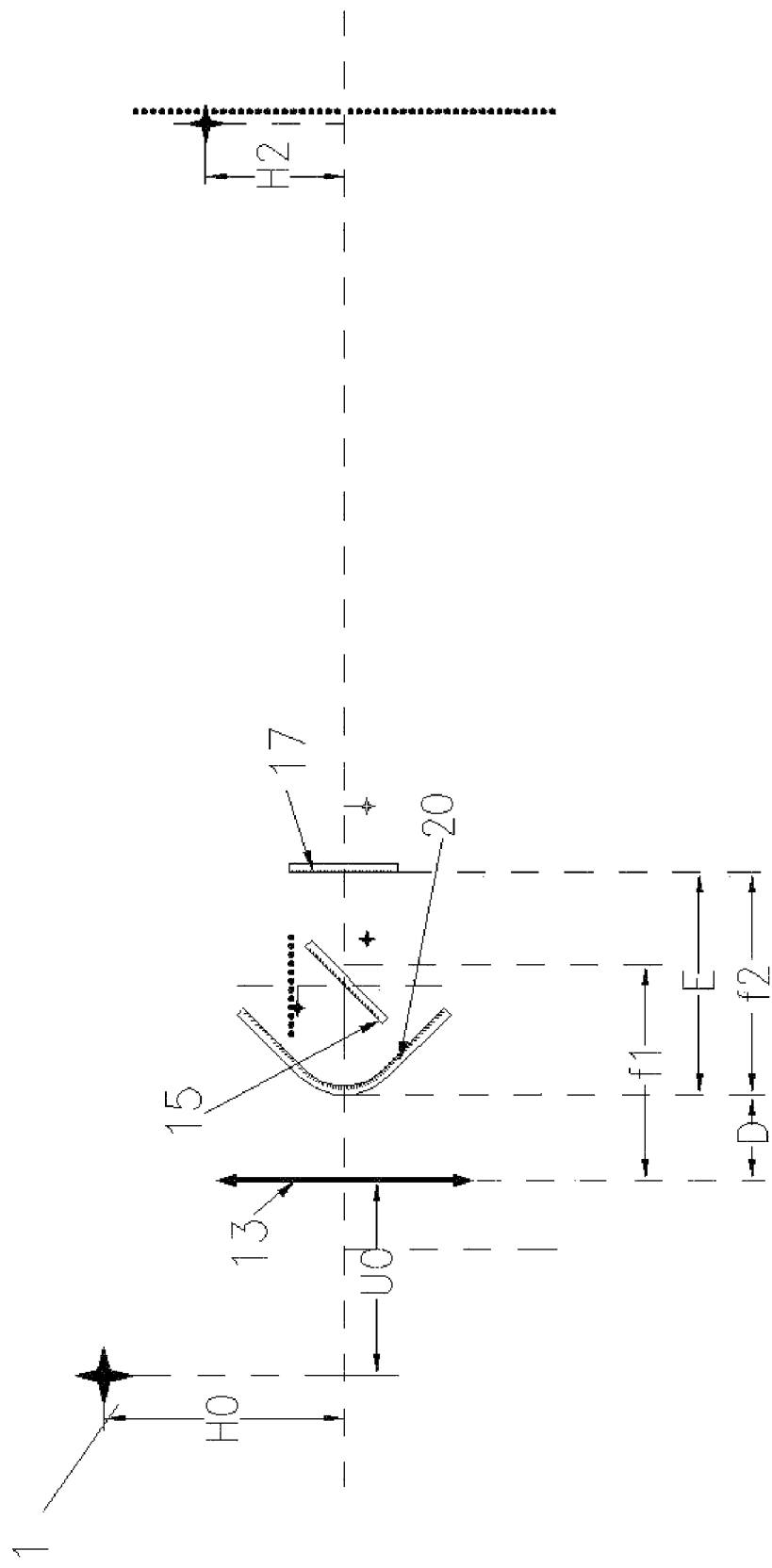
Figure 13:
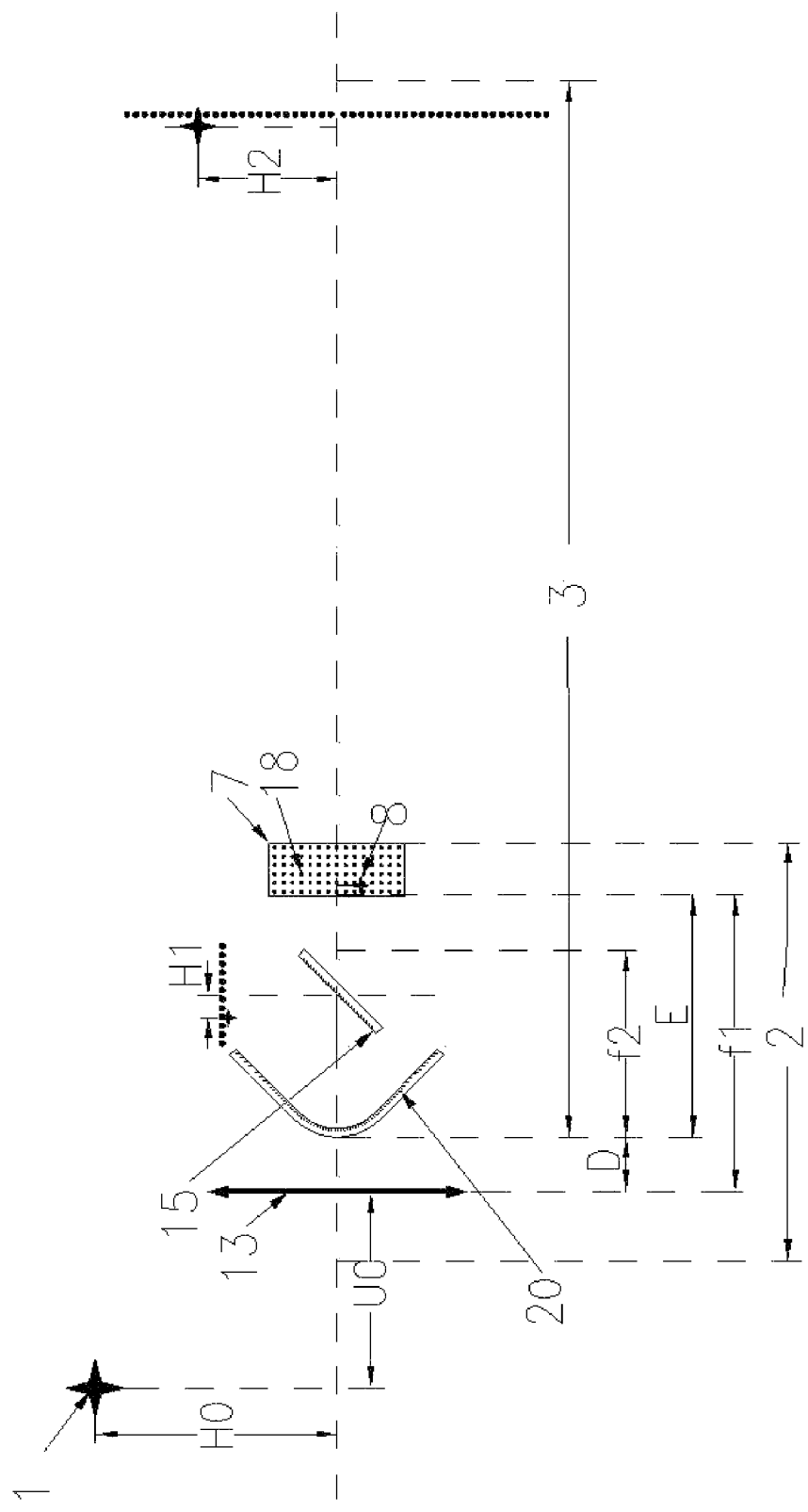

5 are set: f1=35 mm, f2=60 mm, and D=145 mm, and the object distance is longer than 50 meters);

FIG. 10 is a diagram of a relationship between an object distance U0 and image heights H2 and H1 in Experimental Example 1 (when optical system parameters in FIG. 5 are set: f1=35 mm, f2=60 mm, and D=145 mm, and the object distance is longer than 50 meters);

FIG. 11 is a schematic diagram of an optical path configuration in Experimental Example 2;

FIG. 12 is a schematic diagram of an optical path configuration in Experimental Example 3; and FIG. 13 is a schematic diagram of an optical path configuration in Experimental Example 4.

1. Light-emitting object point; 2. image 1 photographing unit; 3. image 2 photographing unit; 4. processing system; 5. image point 1 (including a photoreceptor); 6. image point 2 (including a photoreceptor); 7. image 1 conversion unit; 8. image point i; 9. image 1 parallel correlation imaging unit; 10. image point 1'; 11. signal connection and control line; 12. image 1 parallel correlation imaging unit image conversion unit; 13. convex lens F1; 14. convex lens F2; 15. 45° reflector; 16. convex lens Fi; 17. reflector Fi; 18. body-shaped illuminator Fi; 19. image point i'; 20. concave mirror.

DETAILED DESCRIPTION OF THE EMBODIMENTS

Figure 1:
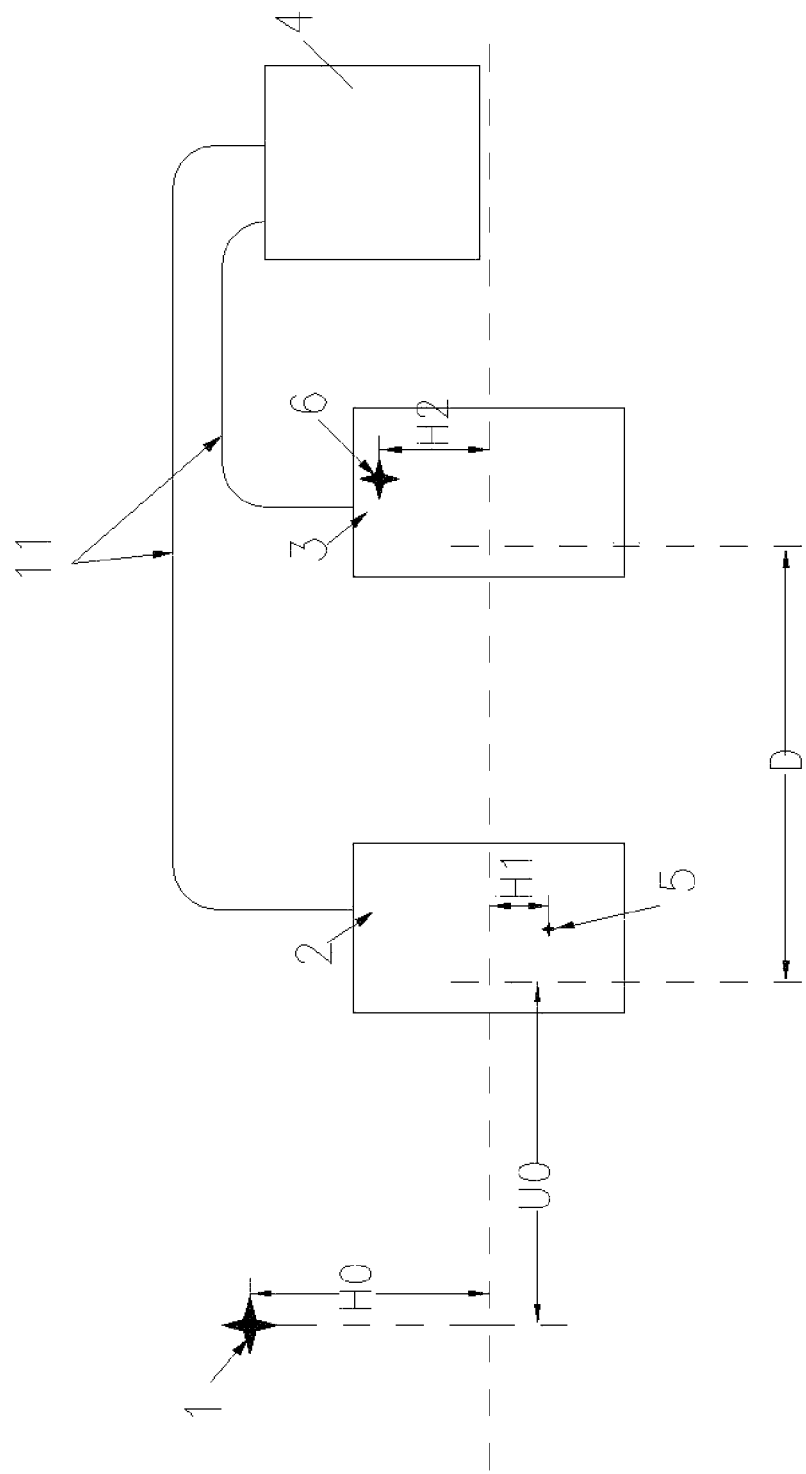
FIG. 1 is a schematic structural diagram of a 3D stereo camera according to the present disclosure.

As shown in FIG. 1, the present disclosure provides a 3D camera, including an image 1 photographing unit 2 and an image 2 photographing unit 3 in the same optical system, and a processing system 4 that processes data of the image 1 photographing unit 2 and the image 2 photographing unit 3. The processing system 4 includes a control unit that controls image photographing by the image 1 photographing unit and the image 2 photographing unit, a recording and storage unit that stores photographed images, and a 3D coordinate calculation unit that performs calculation on the recording and storage unit. The same optical system is a coaxial spherical system. The distance between the principal planes of the image 1 photographing unit 2 and the image 2 photographing unit 3 is D, where D is not less than zero.

Figure 2:
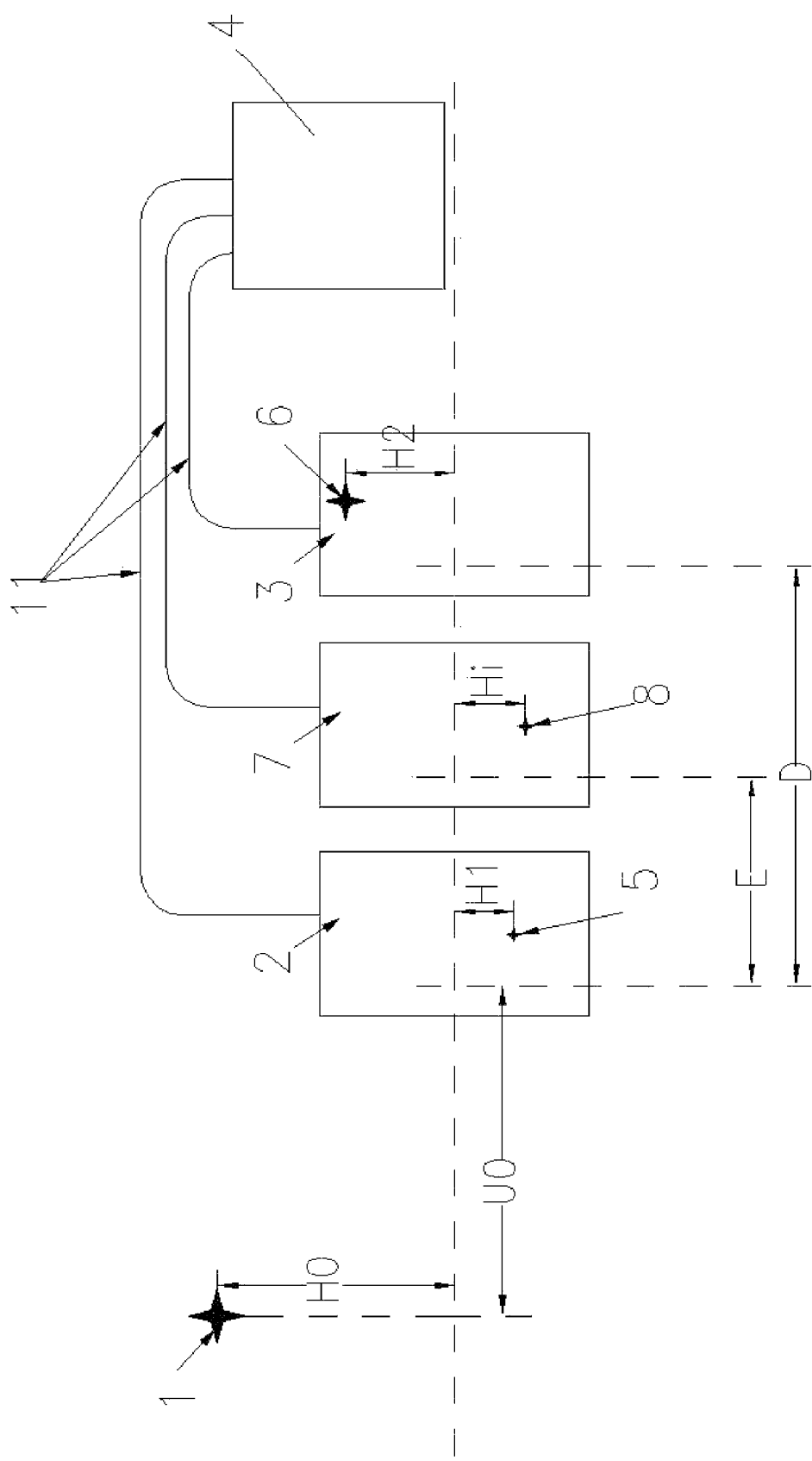
FIG. 2 is a schematic structural diagram of a 3D stereo camera having an image conversion unit behind an image 1 photographing unit.

As shown in FIG. 2, at least one image 1 conversion unit 7 is further disposed between the image 1 photographing unit 2 and the image 2 photographing unit 3. The distance between the principal planes of the image 1 conversion unit 7 and the image 1 photographing unit 2 is E, where E is greater than or equal to zero.

Figure 3:
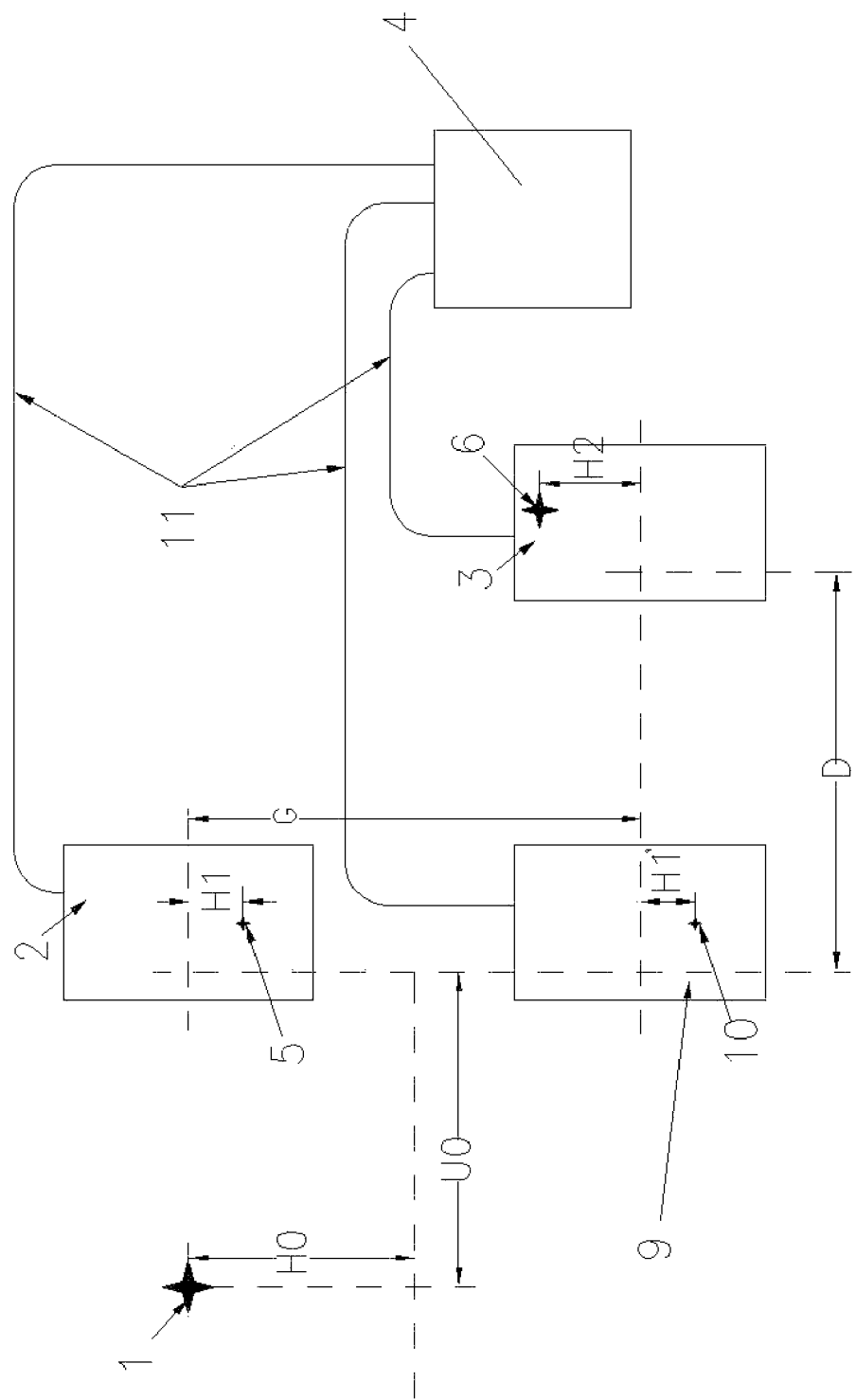
FIG. 3 is a schematic structural diagram of a 3D stereo camera having an image 1 parallel correlation imaging unit.

As shown in FIG. 3 based on FIG. 1, at least one image 1 parallel correlation imaging unit 9 is further disposed for the image 1 photographing unit 2. An optical path of the image 1 parallel correlation imaging unit 9 is the same as or correlates with an optical path of the image 1 photographing unit 2. The optical path correlation means that the imaging characteristics of the two optical paths are represented by some calculation parameters. The distance between the principal planes of the image 1 parallel correlation imaging unit 9 and the image 1 photographing unit 2 is G, where G is greater than or equal to zero.

Figure 4:
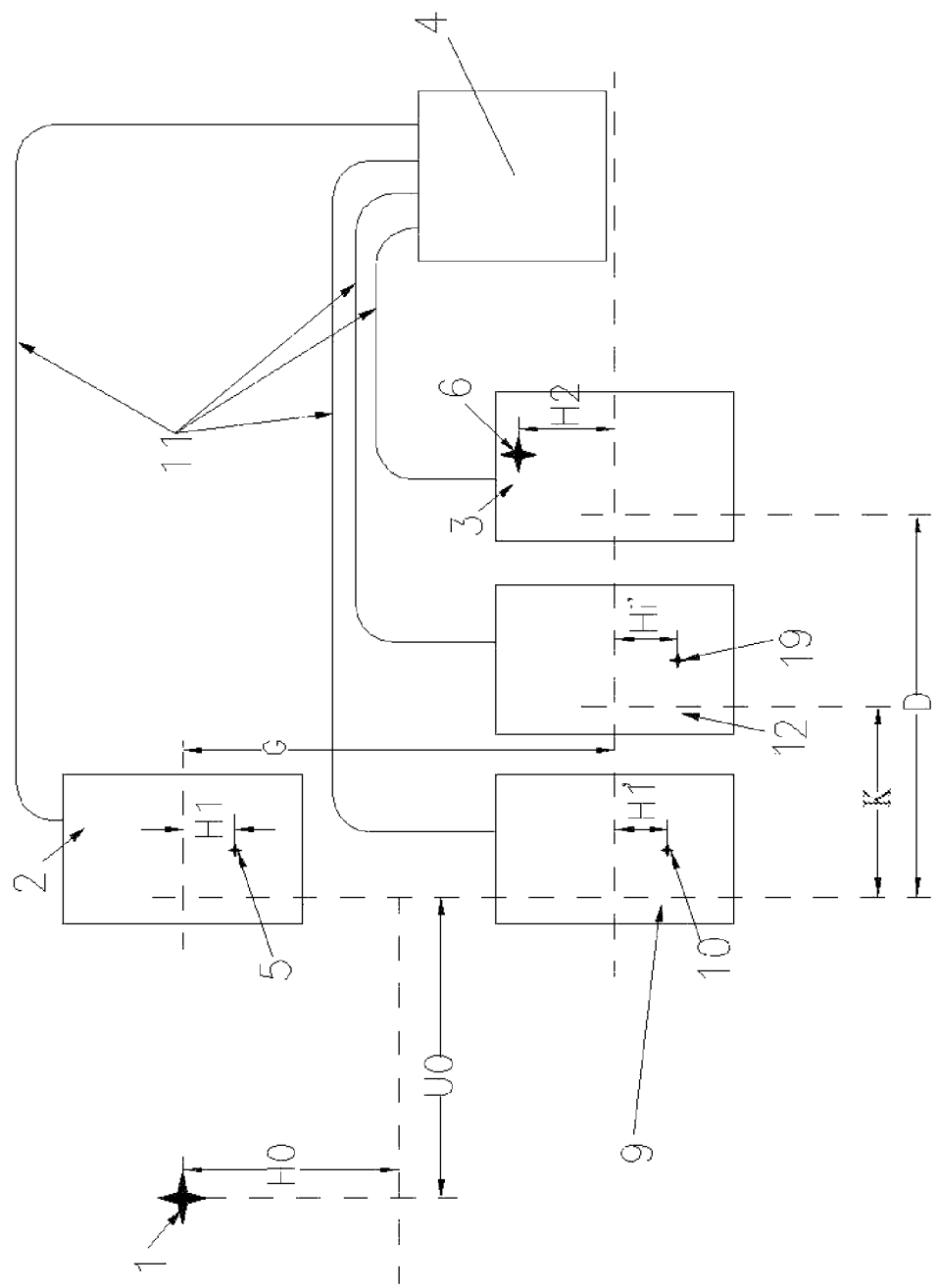
FIG. 4 is a schematic structural diagram of a 3D stereo camera having both a parallel correlation imaging unit and an image conversion unit.

Further, as shown in FIG. 4 based on FIG. 3, at least one image 1 parallel correlation imaging unit conversion unit 12 is further disposed between the image 1 parallel correlation imaging unit 9 and the image 2 photographing unit 3. The distance between the principal planes of the image 1 parallel correlation imaging unit 9 and the conversion unit 12 is K, where K is greater than or equal to zero.

The processing system 4 is connected to the image 1 photographing unit 2, the image 2 photographing unit 3, the image 1 conversion unit 7, the image 1 parallel correlation imaging unit 9, and the image 1 parallel correlation imaging unit conversion unit 12 through signal connection and control lines 11. The image 1 photographing unit 2, the image 2 photographing unit 3, the image 1 conversion unit 7, the image 1 parallel correlation imaging unit 9, and the image 1 parallel correlation imaging unit conversion unit 12 are assembled through imaging optical components, such as convex lenses, concave lenses, concave mirrors, convex mirrors, planar reflectors, body-shaped diffusers, body-shaped illuminators, charge-coupled device (CCD) photoreceptor chips, or complementary metal-oxide-semiconductor (CMOS) photoreceptor chips. For example, the image 1 photographing unit may be assembled through one convex lens and one CCD photoreceptor. The present disclosure further provides a photographing method of a 3D camera. In a coaxial spherical system, 3D coordinates of an object point are represented by an object height H0, an object distance U0, and an optical meridian plane angle α. The method includes the following steps:

(1) The image 1 photographing unit 2 photographs a luminous object point 1 in 3D space and photosensitively records a 2D image 1. There are coordinates, namely, an image height and an optical meridian plane angle, of an image point 1 of the luminous object point 1 on the 2D image 1.

(2) As shown in FIG. 1, when only the image 1 photographing unit 2 and the image 2 photographing unit 3 exist, the image 2 photographing unit 3 photographs the image point 1 5 on the optical path of the image 1 photographing unit 2 and photosensitively records a 2D image 2. There are coordinates, namely, an image height and an optical meridian plane angle, of an image point 2 6 indirectly from the luminous object point 1.

As shown in FIG. 2, when at least one image 1 conversion unit 7 is disposed between the image 1 photographing unit 2 and the image 2 photographing unit 3, the image 1 conversion unit 7 optically converts the image point 1 5 to an image point i 8 on an optical path of the image 1 conversion unit, and the image 2 photographing unit 3 photographs the image point i 8 and photosensitively records a 2D image 3. There are coordinates, namely, an image height and an optical meridian plane angle, of the image point 2 6 indirectly from the object point 1 on the 2D image 3.

As shown in FIG. 3, when at least one image 1 parallel correlation imaging unit 9 is further disposed for the image 1 photographing unit 2, the image 1 parallel correlation imaging unit 9 images the luminous object point 1 in the 3D space to obtain an image point 1' 10, and the image 2 photographing unit 3 photographs the image point 1' 10 and photosensitively records a 2D image 4. There are coordinates, namely, an image height and an optical meridian plane angle, of the image point 2 6 indirectly from the luminous object point 1 on the 2D image 4.

As shown in FIG. 4, when at least one image 1 parallel correlation imaging unit conversion unit 12 is further disposed between the image 1 parallel correlation imaging unit 9 and the image 2 photographing unit 3, the image 1 parallel correlation imaging unit 9 images the luminous object point 1 in the 3D space to obtain the image point 1' 10. The image 1 parallel correlation imaging unit conversion unit 12 optically converts the image point 1' 10 to an image point i' 19 on an optical path of the image 1 parallel correlation imaging unit conversion unit 12, and the image 2 photographing unit 3 photographs the image point i' 19 and photosensitively records a 2D image 5. There are coordinates, namely, an image height and an optical meridian plane angle, of the image point 2 indirectly derived from the object point 1 on the 2D image 5.

(3) The control unit sets a group of optical system parameters, where the image point 1 and the image point 2 of the object point in a specific depth of field can be clearly recorded on the image 1 and the image 2 through the group of parameters, respectively. The recording and storage unit records and stores data of the image 1 and the image 2 on photoreceptors of the image 1 photographing unit and the image 2 photographing unit. The 3D coordinate calculation unit calculates 2D coordinates of the image points on image 1 and image 2 by using the data recorded by the recording and storage unit and the optical system parameters of the image 1 photographing unit and the image 2 photographing unit to obtain 3D coordinates, namely, an object distance, an object height, and an optical meridian plane angle, of the object point in the 3D space, and stores the 3D coordinates.

(4) Repeat step 3) to obtain 3D coordinates of the object point in the 3D space in another depth of field and store the 3D coordinates.

(5) For each object point whose 3D coordinates need to be measured, perform division to obtain one or more depths of field, repeat steps 3) and 4) to obtain a pair of images 1 and 2 of the object point in an entire required depth range, and 3D coordinates, namely, an object distance, an object height, and an optical meridian plane angle, of the object point in the 3D space in the entire depth range, store the 3D coordinates, and display a 3D photo of the object through a display.

Further, light or a wave used to form images 1 and 2 is visible light, infrared light, ultraviolet light, an X-ray, an electromagnetic wave, or an ultrasonic wave.

Further, the object point is luminous due to the light of the object point or light generated by a light source irradiating the object point.

Specific optical path configurations of the 3D stereo camera are described in the following experimental examples.

Experimental Example 1

FIG. 5 is a schematic diagram of an example of an optical path configuration at a specific optical meridian plane angle corresponding to the structure of the 3D space stereo camera system in FIG. 1. The optical path configuration and a photographing process are described as follows:

1. An optical path system is a coaxial spherical system.

2. Photographing and imaging lenses of the image 1 photographing unit and the image 2 photographing unit are both convex lenses. Convex lens 13 and a convex lens 14 have focal lengths of f1 and f2, respectively.

3. A distance between principal planes of the two convex lenses is D.

4. The image 1 photographing unit includes a transflective reflector 15 (as shown in FIG. 5, an upper part of the reflector is reflective and a lower part is transparent) disposed in front of a focus of the convex lens 13 and at 45° to an optical axis. The transflective 45° reflector 15 reflects a part of the light condensed by the convex lens 13 and images this part of light on a photoreceptor (such as CCD or CMOS) in the image 1 photographing unit to obtain a 2D image 1.

5. There are coordinates, namely, an image height and an optical meridian plane angle of an image point 1 5 (or an image point group 1 of an object) from a luminous object point 1 on the 2D image 1.

6. The light passing through the transflective 45° reflector 15 continues to move forward and is imaged on the optical path of the image 1 photographing unit (at an image point of the convex lens 13 shown in FIG. 5 whose image distance is V1 and image height is H1).

7. The light from the image point H1 on the optical path passes through the convex lens 14 and is imaged on the photoreceptor in the image 2 photographing unit to obtain a 2D image 2.

8. There are coordinates, namely, an image height and an optical meridian plane angle, of an image point 2 6 (or an image point group 2 indirectly from the object point) on the 2D image 2.

In the coaxial spherical system, the 3D coordinates of the object point can be described as follows:

H0: object height (a height of the object point on an optical principal axis)

U0: object distance (an axial distance of the object point from a principal point)

α: optical meridian plane angle (A plane formed by the object point and the optical principal axis is a meridian plane in the optical system. When a meridian plane is defined as a principal meridian plane, α is an angle between a meridian plane in which the object point is located and the principal meridian plane.)

The following describes an imaging process of the object point and a principle of calculating the 3D coordinates of the object point by using the foregoing two related 2D images:

The object point and the two image points are in the same optical meridian plane. Therefore, an optical meridian plane angle α0 of the object point is equal to optical meridian plane angles α1 and α2 of the two image points:

$$\alpha 1 = \alpha 2 = \alpha 0 \quad \text{(formula 1)}$$

Under paraxial approximation:

$$\frac{1}{f1} = \frac{1}{U0} + \frac{1}{V1} \quad \text{(formula 2)}$$

$$\frac{1}{f2} = \frac{1}{U2} + \frac{1}{V2} \quad \text{(formula 3)}$$

$$\frac{H0}{U0} = \frac{H1}{V1} \quad \text{(formula 4)}$$

$$\frac{H1}{U2} = \frac{H2}{V2} \quad \text{(formula 5)}$$

$$V1 + U2 = D \quad \text{(formula 6)}$$

In the foregoing 6 formulas, there are a total of 13 parameters. The following 3 parameters are known optical system parameters that are set: f1, f2, and D. The following 4 parameters are obtained through two photosensitive photographing tests: H1, H2, α1, and α2. The photosensitive photographing test includes: A shutter is turned on, the CCD or CMOS is exposed to record an image, and after the shutter is turned on for a specific (very short) time, the shutter is turned off. The following 6 unknown parameters can be obtained by solving the foregoing 6 formulas: H0, U0, α0, V1, U2, and V2. For example, the calculation results of U0, H0, V1, and V2 are as follows:

$$U0 = \frac{-b + \sqrt{b^2 - 4ac}}{2a} \quad \text{(formula 7)}$$

where:

$$a = DDH2/H1 - 2Df1H2/H1 + f1f1H2/H1 - Df2H2/H1 - Df2 + f1f2H2/H1 + f1f2 \quad \text{(formula 7a)}$$

$$b=-2DDf1H2/H1+2Df1f1H2/H1+2Df1f2H2/H1-f1f1f2H2/H1+2Df1f2-f1f1f2 \quad \text{(formula 7b)}$$

$$c=DDf1f1H2/H1-Df1f1f2-Df1f1f2H2/H1 \quad \text{(formula 7c)}$$

$$H0 = \frac{U0 - f1}{f1} H1 \quad \text{(formula 8)}$$

$$V1 = \frac{f1U0}{U0 - f1} \quad \text{(formula 9)}$$

$$V2 = \frac{DU0H2/H1 - Df1H2/H1 - f1U0H2/H1}{U0 - f1} \quad \text{(formula 10)}$$

Formulas 7 and 8 show that the 3D coordinates, namely, the object distance, the object height, and the optical meridian plane angle, of the object point can be calculated by photographing two images and measuring two image heights as shown in FIG. 5 (the object images are in the same meridian plane). When the 3 optical system parameters, namely, the focal lengths f1 and f2, and the distance D between the principal planes of the two convex lenses are fixed, the object distance is related only to an image height ratio (H2/H1), and the object height is related to both the image height (H1) and the image height ratio (H2/H1).

Formulas 9 and 10 show that the image distance of the two photographing units can also be calculated by photographing the two images and measuring the two image heights as shown in FIG. 5. When the 3 optical system parameters, namely, f1, f2, and D, are fixed, two image distances V1 and V2 are also related only to the image height ratio (H2/H1). Generally, the image distance is not measured and the correct image distance corresponds to clear imaging.

When 3D coordinates of an object point are measured, the image 1 photographing unit focuses on the object point (changes the focal length f1 or the image distance V1) and photographs an image 1. When the optical system parameter (focal length f1 or image distance V1) of the image 1 photographing unit is fixed, the image 2 photographing unit focuses on the image 1 on the optical path of the image 1 photographing unit (changes the focal length f2, the image distance V2, or the distance D between the principal planes) and photographs an image 2. The image heights H1 and H2, and the optical meridian plane angle α1=α1=α0 on the two images are measured. Formulas 7 and 8 are used to calculate the object distance U0 and the object height H0 of the object point. The 3D coordinates of the object point are obtained: α0, U0, and H0.

Figure 6:
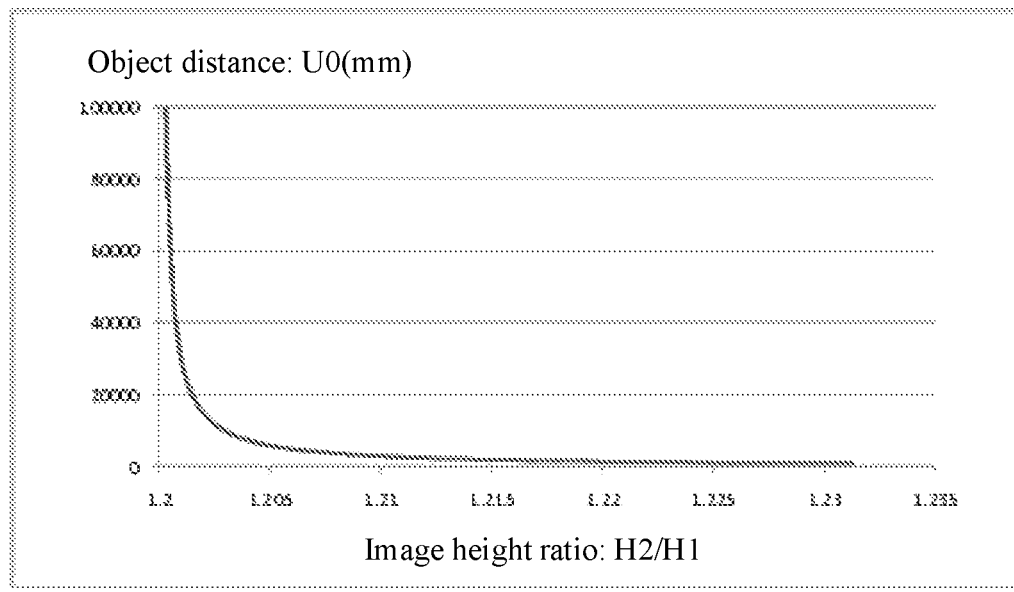
FIG. 6 is a diagram of a relationship between an image height ratio and an object distance of an object point in Experimental Example 1 (when optical system parameters in FIG. 5 are set: f1=35 mm, f2=60 mm, and D=145 mm)

When the optical system parameters in FIG. 5 are set: f1=35 mm, f2=60 mm, and D=145 mm, the relationship between the image height ratio and the object distance of the object point is shown in FIG. 6. A low measured image height ratio corresponds to a long object distance of the object point.

A sized object in 3D space can be regarded as an object point group within an object distance range in a depth direction corresponding to the size of the object. A plurality of objects in 3D space can be regarded as a plurality of object point groups within a specific object distance range. If a plurality of objects is within a specific depth-of-field range of an optical system, an optical meridian plane angle of an object point group can be obtained by photographing a pair of images within the depth-of-field range and measuring an optical meridian plane angle of an image point group corresponding to the object point group on the images. Coordinates of an object distance and an object height of the object point group are calculated by using formulas 7 and 8.

This corresponds to taking a stereo photo within the depth-of-field range. A stereo photo of the 3D object within a larger object distance/depth range can be obtained by changing the optical system parameter configuration and the depth-of-field range and scanning and photographing a pair of images.

Figure 7:
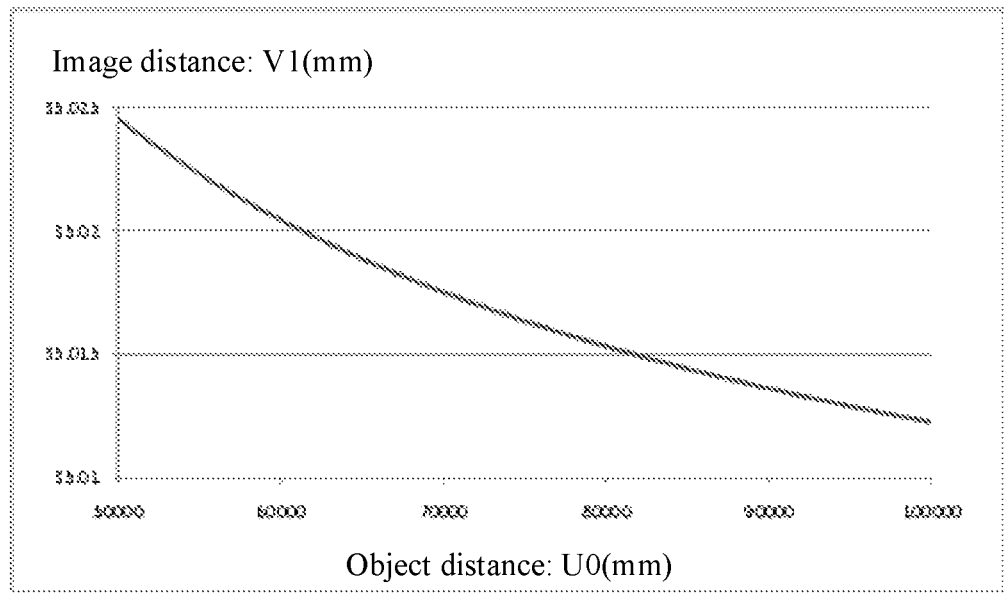
FIG. 7 is a diagram of a relationship between an object distance U0 and an image distance V1 in Experimental Example 1 (when optical system parameters in FIG. 5 are set: f1=35 mm, f2=60 mm, and D=145 mm, and the object distance is longer than 50 meters)
Figure 8:
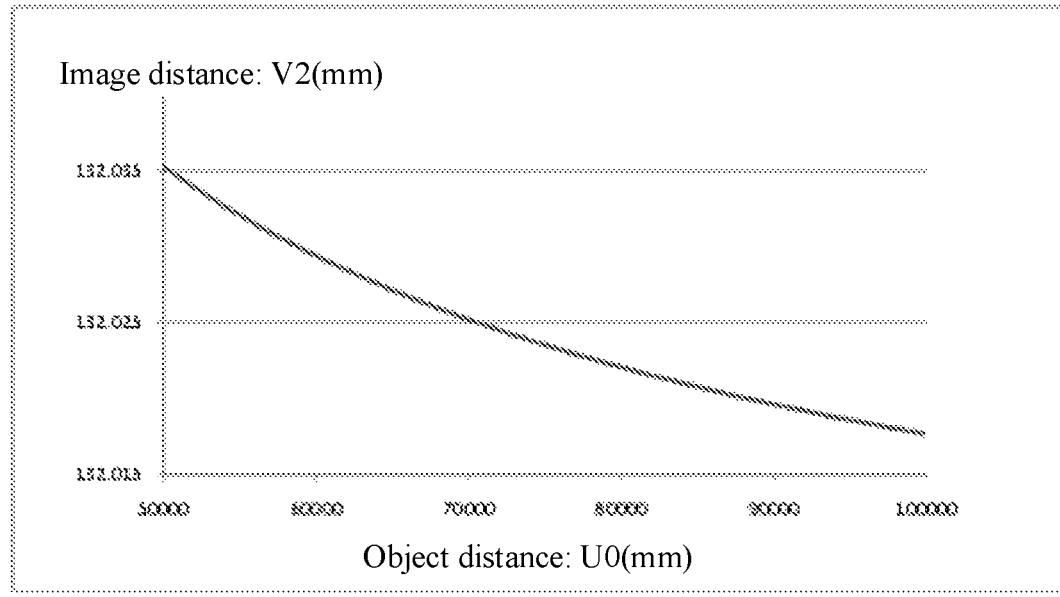
FIG. 8 is a diagram of a relationship between an object distance U0 and an image distance V2 in Experimental Example 1 (when optical system parameters in FIG. 5 are set: f1=35 mm, f2=60 mm, and D=145 mm, and the object distance is longer than 50 meters)
Figure 9:
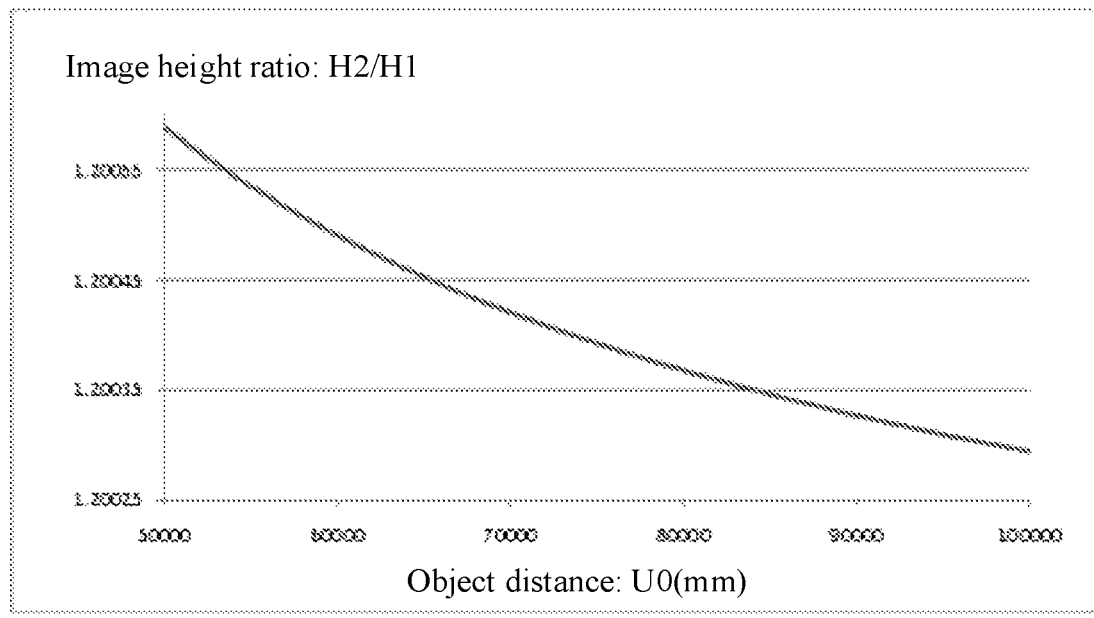
FIG. 9 is a diagram of a relationship between an object distance U0 and an image height ratio H2/H1 in Experimental Example 1 (when optical system parameters in FIG.

The following further describes how to determine the 3D coordinates of the object group in the 3D space by photographing a pair of images with reference to diagrams. When the optical system parameters in FIG. 5 are set: f1=35 mm, f2=60 mm, and D=145 mm, and the object distance is greater than 50 meters, the relationship between the image distance and the object distance of the image 1 is shown in FIG. 7, and that of the image 2 is shown in FIG. 8. The relationship between the image height ratio and the object distance is shown in FIG. 9. When the object height H0=1000 mm, the relationship between the object distance U0 and the image heights H2 and H1 is shown in FIG. 10.

FIG. 7 and FIG. 8 show that when a plurality of objects have object distances of more than 60 meters, variations of the image distances V1 and V2 are very small (less than +, −10 um), and it can be considered that the objects can all be focused and imaged in the same pair of images. In other words, in the optical system in FIG. 5, when the optical system parameters f1=35 mm, f2=60 mm, and D=145 mm are used, the depth of field of the system is more than 60 meters (or the depth-of-field range is 60 meters to infinity). FIG. 9 shows that beyond 60 meters, the image height ratio still decreases monotonically with the increase of the object distance. FIG. 10 shows that for an object whose height is 1 meter, between 60 meters to 100 meters, two image heights are still measurable. FIG. 7, FIG. 8, FIG. 9, and FIG. 10 show that in the optical system of the present disclosure, the 3D coordinates of the object within the depth-of-field range can be measured and calculated by photographing a pair of images in the depth of field of the system. The measurement method is as follows: The image heights H1 and H2, and the optical meridian plane angle α1=α1=α0 of the image point group on the two images are measured. Formulas 7 and 8 are used to calculate the object distance U0 and the object height H0 of the corresponding object point group. The 3D coordinates of the object point group in the depth-of-field range of the system are obtained: α0, U0, and H0.

The depth-of-field range of the system can be changed by changing the focal lengths (f1 and f2) of the system and the distance (D) between the principal planes. Pairs of images can be photographed (scanned and photographed) with different depth-of-field ranges to measure 3D coordinates (an optical meridian plane angle, an object distance, and an object height) of the object group in the 3D space within a larger object distance range, or take a stereo photo of the object group in the 3D space within the larger object distance range.

The foregoing 3D coordinate measurement and calculation principle of the 3D stereo camera can be further extended to generally applicable non-paraxial approximation. In non-coaxial optical systems, formulas for calculating 3D coordinates of an object point can be unified as follows:

The formulas are all functions of the following three types of parameters:

A set of all optical system parameters of the optical system is Oi (i=1, ..., N).

Oi is a minimum or independent set of N optical system parameters that can describe characteristics of the entire optical system, such as an object-side/object-side focal length of each optical component, an object-side/image-side principal plane distance, an aspherical geometric parameter of each component, and a principal plane distance or a relative position between components.

The optical meridian plane angle of the image point 1 is α1 and that of the image point 2 is α2.

The image height of the image point 1 is H1 and that of the image point 2 is H2.

That is:

The optical meridian plane angle of the object point is α0.

$$\alpha 0 = \Phi(Oi, \alpha 1, \alpha 2, H1, H2)$$

$$i = 1, 2, \ldots, N \quad \text{(formula 11)}$$

The object distance of the object point is U0;

$$U0 = \Omega(Oi, \alpha 1, \alpha 2, H1, H2)$$

$$i = 1, 2, \ldots, N \quad \text{(formula 12)}$$

The object height of the object point is H0;

$$H0 = \Psi(Oi, \alpha 1, \alpha 2, H1, H2)$$

$$i = 1, 2, \ldots, N \quad \text{(formula 13)}.$$

Formulas 11, 12, and 13 can be applied to the calculation of the 3D coordinates of the object point or object point group in the following several embodiments.

Experimental Example 2

Specifically, FIG. 11 is a schematic diagram of an example of an optical path configuration at a specific optical meridian plane angle corresponding to the structure of the 3D space stereo camera system in FIG. 2. The optical path configuration and a photographing process are described as follows:

1. An optical path system is a coaxial spherical system.
2. Photographing and imaging lenses of the image 1 photographing unit and the image 2 photographing unit are both convex lenses. A convex lens 13 and a convex lens 14 have focal lengths of f1 and f2, respectively.
3. The distance between the principal planes of the convex lenses 13 and 14 is D.
4. The image 1 conversion unit is behind the image 1 photographing unit.
5. The image 1 conversion unit includes a convex lens 16 (convex lens Fi) that has a focal length of fi.
6. The distance between the principal planes of the convex lenses 16 and 14 is E.
7. The image 1 photographing unit includes a transflective reflector 15 (as shown in FIG. 11, an upper part of the reflector 15 is reflective and a lower part is transparent) disposed in the front of the focus of the convex lens 13 and at 45° to an optical axis. The transflective 45° reflector 15 reflects a part of light condensed by the convex lens 13 and images this part of light on a photoreceptor (such as CCD or CMOS) in the image 1 photographing unit to obtain a 2D image 1.
8. There are coordinates, namely, an image height and an optical meridian plane angle of an image point 1 (or an image point group 1 of an object) from an object point (light) on the 2D image 1.
9. The light passing through the transflective 45° reflector 15 continues to move forward and is imaged on the optical path of the image 1 photographing unit (at an image point of the lens F1 shown in FIG. 11 whose image distance is V1 and image height is H1).
10. The light from the image point H1 on the optical path passes through the convex lens Fi 16 and is imaged on the optical path of the image 1 conversion unit (at an image point of the lens Fi shown in FIG. 11 whose image distance is Vi and image height is Hi). The image point shown in the figure is virtual.
11. The light from the image point Hi on the optical path passes through the convex lens F2 and is imaged on the photoreceptor in the image 2 photographing unit to obtain a 2D image 2.
12. There are coordinates, namely, an image height and an optical meridian plane angle, of an image point 2 (or an image point group 2 indirectly from the object point) on the 2D image 2.

The 3D coordinates of the object point or object point group within the depth-of-field range of the optical system are calculated by using formulas 11, 12, and 13. The depth-of-field range of the system can be changed by changing the focal lengths (f1, f2, and fi) of the system and the distances (D and E) between the principal planes. Pairs of images can be photographed (scanned and photographed) with different depth-of-field ranges to measure 3D coordinates (an optical meridian plane angle, an object distance, and an object height) of the object group in the 3D space within a larger object distance range, or take a stereo photo of the object group in the 3D space within the larger object distance range.

Experimental Example 3

Specifically, FIG. 12 is a schematic diagram of an example of an optical path configuration at a specific optical meridian plane angle corresponding to the structure of the 3D space stereo camera system in FIG. 2. The optical path configuration and a photographing process are described as follows:

1. An optical path system is a coaxial spherical system.
2. The image 1 photographing unit includes a convex lens 13 (convex lens F1) that has a focal length of f1. The image 2 photographing unit includes a concave mirror 20 that has a focal length of f2.
3. The concave mirror 20 has a convex surface fully transparent and a concave surface partially reflective.
4. The distance between principal planes of the convex lenses 13 and the concave mirror 20 is D.
5. There is the image 1 conversion unit behind the image 1 photographing unit.
6. The image 1 conversion unit includes a planar reflector Fi 17 whose left side is reflective as shown in FIG. 12.
7. The distance between the principal planes of the concave mirror 20 and the reflector Fi 17 is E.
8. The image 1 photographing unit includes a transflective reflector 15 (as shown in FIG. 12, an upper part of the reflector is reflective and a lower part is transparent) disposed in front of a focus of the convex lens 13 and at 45° to an optical axis. The transflective 45° reflector 15 reflects a part of the light condensed by the convex lens 13 and light passing through the concave mirror 20 and images this part of light on a photoreceptor (such as CCD or CMOS) in the image 1 photographing unit to obtain a 2D image 1.
9. There are coordinates, namely, an image height and an optical meridian plane angle of an image point 1 (or an image point group 1 of an object) from an object point (light) on the 2D image 1.
10. The light passing through the transflective 45° reflector continues to move forward and is imaged on the optical path of the image 1 photographing unit (at an image point H1 on the right side of the transflective 45° reflector shown in FIG. 12).

11. The light from the image point H1 on the optical path passes through the reflector Fi 17 and is imaged at Hi on the right side of the reflector Fi 17 shown in FIG. 12. The image point Hi is virtual.

12. The light from the image point Hi on the optical path passes through the concave mirror 20 and is imaged on the photoreceptor in the image 2 photographing unit to obtain a 2D image 2.

13. There are coordinates, namely, an image height and an optical meridian plane angle, of an image point 2 (or an image point group 2 indirectly from the object point) on the 2D image 2.

The 3D coordinates of the object point or object point group within the depth-of-field range of the optical system are calculated by using formulas 11, 12, and 13. The depth-of-field range of the system can be changed by changing the focal lengths (f1 and f2) of the system and the distances (D and E) between the principal planes. Pairs of images can be photographed (scanned and photographed) with different depth-of-field ranges to measure 3D coordinates (an optical meridian plane angle, an object distance, and an object height) of the object group in the 3D space within a larger object distance range, or take a stereo photo of the object group in the 3D space within the larger object distance range.

Experimental Example 4

FIG. 13 is a schematic diagram of an example of an optical path configuration at a specific optical meridian plane angle corresponding to the structure of the 3D space stereo camera system in FIG. 2. The optical path configuration and a photographing process are described as follows:

1. An optical path system is a coaxial spherical system.

2. The image 1 photographing unit includes a convex lens 13 (convex lens F1) that has a focal length of f1. The image 2 photographing unit includes a concave mirror 20 that has a focal length of f2.

3. The concave mirror 20 has a convex surface fully transparent and a concave surface partially reflective.

4. The distance between the principal planes of the convex lenses 13 and the concave mirror 20 is D.

5. The image 1 conversion unit is behind the image 1 photographing unit.

6. The image 1 conversion unit includes a body-shaped diffuser or body-shaped illuminator Fi 18 as shown in FIG. 13.

7. The distance between the principal planes of the concave mirror 20 and the body-shaped diffuser Fi 18 is E as shown in FIG. 13.

8. The image 1 photographing unit includes a transflective reflector (as shown in FIG. 13, an upper part of the reflector is reflective and a lower part is transparent) disposed in front of the focus of the convex lens F1 and at 45° to an optical axis. The transflective 45° reflector reflects a part of light condensed by the convex lens F1 and light passing through the concave mirror 20 and images this part of light on a photoreceptor (such as CCD or CMOS) in the image 1 photographing unit to obtain a 2D image 1.

9. There are coordinates, namely, an image height and an optical meridian plane angle of an image point 1 (or an image point group 1 of an object) from an object point (light) on the 2D image 1.

10. The light passing through the transflective 45° reflector continues to move forward and is imaged on the optical path of the image 1 photographing unit (at an image point H1 on the right side of the transflective 45° reflector shown in FIG. 12).

11. The light from the image point H1 on the optical path passes through the body-shaped diffuser and is diffused and can be regarded as being imaged at the image point H1. The image point Hi is real.

12. The light from the image point Hi on the optical path passes through the concave mirror 20 and is imaged on the photoreceptor in the image 2 photographing unit to obtain a 2D image 2.

13. There are coordinates, namely, an image height and an optical meridian plane angle, of an image point 2 (or an image point group 2 indirectly from the object point) on the 2D image 2.

The 3D coordinates of the object point or object point group within the depth-of-field range of the optical system are calculated by using formulas 11, 12, and 13. The depth-of-field range of the system can be changed by changing the focal lengths (f1 and f2) of the system and the distances (D and E) between the principal planes. Pairs of images can be photographed (scanned and photographed) with different depth-of-field ranges to measure 3D coordinates (an optical meridian plane angle, an object distance, and an object height) of the object group in the 3D space within a larger object distance range, or take a stereo photo of the object group in the 3D space within the larger object distance range.

What is claimed is:

1. A three-dimensional (3D) camera configured to capture a first image (image 1) and a second image (image 2), the 3D camera comprising an image 1 photographing unit and an image 2 photographing unit in a same optical system, and a processing system, wherein the processing system is configured to process data of the image 1 photographing unit and data of the image 2 photographing unit, the image 1 photographing unit photographs an object point in a 3D space and the image 1 photographing unit photosensitively records a two-dimensional (2D) image 1, the image 2 photographing unit photographs an image point on an optical path of the image 1 photographing unit and the image 2 photographing unit photosensitively records a 2D image 2, wherein the processing system comprises a control unit, a recording and storage unit, and a 3D coordinate calculation unit, and the processing system is connected to the image 1 photographing unit and the image 2 photographing unit through a first signal connection and first control lines;

wherein the control unit controls an image photographing by the image 1 photographing unit and the image 2 photographing unit; the recording and storage unit stores photographed images; the 3D coordinate calculation unit calculates 3D coordinates based on data recorded by the recording and storage unit, and the calculations of the calculation unit include calculating a height ratio relationship of a pair of object points including a first object point in image 1 and a second object point in image 2.

2. The 3D camera according to claim 1, wherein the same optical system is a coaxial spherical system, a first distance is between a principal plane of the image 1 photographing unit and a principal plane of the image 2 photographing unit, and the first distance is at least zero.

3. The 3D camera according to claim 2, wherein at least one image 1 conversion unit is further disposed between the image 1 photographing unit and the image 2 photographing unit, the at least one image 1 conversion unit is connected to the processing system through a second signal connection and a second control line, a second distance is between a principal plane of the at least one image 1 conversion unit and the principal plane of the image 1 photographing unit, and the second distance is at least zero.

4. The 3D camera according to claim 2, wherein at least one image 1 parallel correlation imaging unit is further disposed for the image 1 photographing unit, the at least one image 1 parallel correlation imaging unit is connected to the processing system through a third signal connection and a third control line, an optical path of the at least one image 1 parallel correlation imaging unit is the same as the optical path of the image 1 photographing unit or the optical path of the at least one image 1 parallel correlation imaging unit correlates with the optical path of the image 1 photographing unit, a third distance is between a principal point of the at least one image 1 parallel correlation imaging unit and a principal point of the image 1 photographing unit, and the third distance is at least zero.

5. The 3D camera according to claim 4, wherein at least one image 1 parallel correlation imaging unit conversion unit is further disposed between the at least one image 1 parallel correlation imaging unit and the image 2 photographing unit, the at least one image 1 parallel correlation imaging unit conversion unit is connected to the processing system through a fourth signal connection and a fourth control line, a fourth distance is between the principal plane of the at least one image 1 parallel correlation imaging unit and a principal plane of the at least one image 1 parallel correlation imaging unit conversion unit, and the fourth distance is at least zero.

6. A photographing method using the 3D camera according to claim 1, wherein when the optical system is a coaxial spherical system, 3D coordinates of an object point are represented by an object height H0, an object distance U0, and an optical meridian plane angle $\alpha$, when a meridian plane is defined as a principal meridian plane, $\alpha$ is an angle between a meridian plane where the object point is located and the principal meridian plane, and the method comprises the following steps:

1) Photographing, by the image 1 photographing unit, the object point in the 3D space, and photosensitively recording the 2D image 1, wherein 2D coordinates of an image point 1 of the object point on the 2D image 1 comprise an image height and an optical meridian plane angle;

2) Photographing, by the image 2 photographing unit, the image point 1 on the optical path of the image 1 photographing unit, and photosensitively recording the 2D image 2, wherein 2D coordinates of an image point 2 on the 2D image 2 comprise an image height and an optical meridian plane angle, wherein the image point 2 is indirectly from the object point;

3) Setting, by the control unit, a group of optical system parameters, wherein the image point 1 of the object point in a first predetermined depth of field and the image point 2 of the object point in the first predetermined depth of field are clearly recorded on the image 1 and the image 2 through the group of optical system parameters, respectively; recording and storing, by the recording and storage unit, data of the image 1 on a photoreceptor of the image 1 photographing unit and data of the image 2 on a photoreceptor of the image 2 photographing unit; and calculating, by the 3D coordinate calculation unit, 2D coordinates of the image point on the image 1 and 2D coordinates of the image point on the image 2 by using the data recorded by the recording and storage unit and the optical system parameters of the image 1 photographing unit and the optical system parameters of the image 2 photographing unit to obtain the 3D coordinates of the object point in the 3D space, and storing the 3D coordinates, wherein the 3D coordinates comprise an object distance, an object height, and an optical meridian plane angle;

4) Repeating step 3) to obtain 3D coordinates of the object point in the 3D space in a second predetermined depth of field, and storing the 3D coordinates; and 5) For each object point, wherein 3D coordinates of each object point need to be measured, performing a division to obtain at least one depth of field, repeating steps 3) and 4) to obtain a pair of an image 1 and an image 2 of the object point in an entire depth range, and 3D coordinates of the object point in the 3D space in the entire depth range, wherein the 3D coordinates comprise an object distance, an object height, and an optical meridian plane angle, storing the 3D coordinates, and displaying a 3D photo of the object through a display or a projector.

7. The photographing method according to claim 6, wherein in step 2), at least one image 1 conversion unit is disposed between the image 1 photographing unit and the image 2 photographing unit, the at least one image 1 conversion unit optically converts the image point 1 to an image point i on an optical path of the at least one image 1 conversion unit, the image 2 photographing unit photographs the image point i and the image 2 photographing unit photosensitively records a 2D image 3, and 2D coordinates of the image point 2 on the image 3 comprise an image height and an optical meridian plane angle, wherein the image point 2 is indirectly from the object point.

8. The photographing method according to claim 6, wherein in step 2), at least one image 1 parallel correlation imaging unit is further disposed for the image 1 photographing unit, the at least one image 1 parallel correlation imaging unit images the object point in the 3D space to obtain an image point 1', the image 2 photographing unit photographs the image point 1' and the image 2 photographing unit photosensitively records a 2D image 4, and 2D coordinates of the image point 2 on the image 4 comprise an image height and an optical meridian plane angle, wherein the image point 2 is indirectly from the object point.

9. The photographing method according to claim 8, wherein in step 2), at least one image 1 parallel correlation imaging unit conversion unit is further disposed between the at least one image 1 parallel correlation imaging unit and the image 2 photographing unit, the at least one image 1 parallel correlation imaging unit images the object point in the 3D space to obtain the image point 1', the at least one image 1 parallel correlation imaging unit conversion unit optically converts the image point 1' to an image point i' on an optical path of the at least one image 1 parallel correlation imaging unit conversion unit, the image 2 photographing unit photographs the image point i' and the image 2 photographing unit photosensitively records a 2D image 5, and 2D coordinates of the image point 2 on the image 5 comprise an image height and an optical meridian plane angle, wherein the image point 2 is indirectly from the object point.

10. The photographing method according to claim 7, wherein a light or a wave is selected from the group consisting of a visible light, an infrared light, an ultraviolet light, an X-ray, an electromagnetic wave, and an ultrasonic wave, wherein the light or the wave is configured to form the image 1 and the image 2, the image 3, an image 4, or an image 5.

11. The photographing method according to claim 7, wherein the object point is luminous due to a light of the object point or a light generated by a light source, wherein the light source irradiates the object point.

12. The photographing method according to claim 7, wherein in step 3), the step of calculating, by the 3D coordinate calculation unit, the 2D coordinates of the image point on the image 1 and the 2D coordinates of the image point on the image 2 by using the data recorded by the recording and storage unit and the optical system parameters of the image 1 photographing unit and the optical system parameters of the image 2 photographing unit to obtain the 3D coordinates of the object point in the 3D space, wherein the 3D coordinates comprise the object distance, the object height, and the optical meridian plane angle is specifically as follows:

a set of the optical system parameters of the optical system is Oi (i=1, . . . , N);

Oi is a minimum or independent set of N optical system parameters, wherein Oi is configured to describe characteristics of the optical system;

the optical meridian plane angle of the image point 1 is α1 and the optical meridian plane angle of the image point 2 is α2;

the image height of the image point 1 is H1 and the image height of the image point 2 is H2;

the optical meridian plane angle of the object point is α0;

$$\alpha 0=\Phi(Oi,\alpha 1,\alpha 2,H1,H2)$$

$$i=1,2,\ldots,N \qquad \text{(formula 11)}$$

the object distance of the object point is U0;

$$U0=\Omega(Oi,\alpha 1,\alpha 2,H1,H2)$$

$$i=1,2,\ldots,N \qquad \text{(formula 12)}$$

the object height of the object point is H0;

$$H0=\Psi(Oi,\alpha 1,\alpha 2,H1,H2)$$

$$i=1,2,\ldots,N \qquad \text{(formula 13)}.$$

13. The photographing method according to claim 8, wherein a light or a wave is selected from the group consisting of a visible light, an infrared light, an ultraviolet light, an X-ray, an electromagnetic wave, and an ultrasonic wave, wherein the light or the wave is configured to form the image 1 and the image 2, the image 3, the image 4, or an image 5.

14. The photographing method according to claim 9, wherein a light or a wave is selected from the group consisting of a visible light, an infrared light, an ultraviolet light, an X-ray, an electromagnetic wave, and an ultrasonic wave, wherein the light or the wave is configured to form the image 1 and the image 2, the image 3, the image 4, or the image 5.

15. The photographing method according to claim 8, wherein the object point is luminous due to a light of the object point or a light generated by a light source, wherein the light source irradiates the object point.

16. The photographing method according to claim 9, wherein the object point is luminous due to a light of the object point or a light generated by a light source, wherein the light source irradiates the object point.

17. The photographing method according to claim 7, wherein in step 3), the step of calculating, by the 3D coordinate calculation unit, the 2D coordinates of the image point on the image 1 and the 2D coordinates of the image point on the image 2 by using the data recorded by the recording and storage unit and the optical system parameters of the image 1 photographing unit and the optical system parameters of the image 2 photographing unit to obtain the 3D coordinates of the object point in the 3D space, wherein the 3D coordinates comprise the object distance, the object height, and the optical meridian plane angle is specifically as follows:

a set of the optical system parameters of the optical system is Oi (i=1, . . . , N);

Oi is a minimum or independent set of N optical system parameters, wherein Oi is configured to describe characteristics of the optical system;

the optical meridian plane angle of the image point 1 is α1 and the optical meridian plane angle of the image point 2 is α2;

the image height of the image point 1 is H1 and the image height of the image point 2 is H2;

the optical meridian plane angle of the object point is α0;

$$\alpha 0=\Phi(Oi,\alpha 1,\alpha 2,H1,H2)$$

$$i=1,2,\ldots,N \qquad \text{(formula 11)}$$

the object distance of the object point is U0;

$$U0=\Omega(Oi,\alpha 1,\alpha 2,H1,H2)$$

$$i=1,2,\ldots,N \qquad \text{(formula 12)}$$

the object height of the object point is H0;

$$H0=\Psi(Oi,\alpha 1,\alpha 2,H1,H2)$$

$$i=1,2,\ldots,N \qquad \text{(formula 13)}.$$

18. The photographing method according to claim 8, wherein in step 3), the step of calculating, by the 3D coordinate calculation unit, the 2D coordinates of the image point on the image 1 and the 2D coordinates of the image point on the image 2 by using the data recorded by the recording and storage unit and the optical system parameters of the image 1 photographing unit and the optical system parameters of the image 2 photographing unit to obtain the 3D coordinates of the object point in the 3D space, wherein the 3D coordinates comprise the object distance, the object height, and the optical meridian plane angle is specifically as follows:

a set of the optical system parameters of the optical system is Oi (i=1, . . . , N);

Oi is a minimum or independent set of N optical system parameters, wherein Oi is configured to describe characteristics of the optical system;

the optical meridian plane angle of the image point 1 is α1 and the optical meridian plane angle of the image point 2 is α2;

the image height of the image point 1 is H1 and the image height of the image point 2 is H2;

the optical meridian plane angle of the object point is α0;

$$\alpha 0=\Phi(Oi,\alpha 1,\alpha 2,H1,H2)$$

$$i=1,2,\ldots,N \qquad \text{(formula 11)}$$

the object distance of the object point is U0;

$$U0 = \Omega(Oi, \alpha 1, \alpha 2, H1, H2)$$

$$i = 1, 2, \ldots, N \qquad \text{(formula 12)}$$

the object height of the object point is H0;

$$H0 = \Psi(Oi, \alpha 1, \alpha 2, H1, H2)$$

$$i = 1, 2, \ldots, N \qquad \text{(formula 13)}.$$

* * * * *